United States Patent [19]

Deloza

[11] Patent Number: 6,019,265
[45] Date of Patent: Feb. 1, 2000

[54] SNOWBOARD RACK FOR PICKUP TRUCKS

[76] Inventor: Edward Deloza, 14720 Loyola St., Moorpark, Calif. 93021

[21] Appl. No.: 09/152,041

[22] Filed: Sep. 12, 1998

[51] Int. Cl.⁷ .................................................. B60R 9/12
[52] U.S. Cl. ....................... 224/405; 224/551; 224/554; 224/571; 224/917.5
[58] Field of Search ................................. 224/402, 403, 224/405, 545, 546, 548, 550, 551, 552, 567, 568, 571, 917.5, 924, 554

[56] References Cited

U.S. PATENT DOCUMENTS

| | | | |
|---|---|---|---|
| 2,532,909 | 12/1950 | Hart | 224/551 |
| 2,569,678 | 10/1951 | Larson et al. | 224/551 |
| 3,912,139 | 10/1975 | Bowman . | |
| 4,234,112 | 11/1980 | Gallant | 224/917.5 X |
| 4,339,064 | 7/1982 | Ziaylek, Jr. | 224/324 |
| 4,419,872 | 12/1983 | Plifka | 70/18 |
| 4,469,257 | 9/1984 | Parker . | |
| 4,582,015 | 4/1986 | Hunter | 224/917.5 X |
| 4,823,997 | 4/1989 | Krieger | 224/537 X |
| 5,390,837 | 2/1995 | Ruffolo, Jr. . | |
| 5,497,927 | 3/1996 | Peterson | 224/924 X |
| 5,752,638 | 5/1998 | Meeks | 224/917.5 X |
| 5,769,293 | 6/1998 | Zaretsky | 224/551 |
| 5,906,304 | 5/1999 | Baldacchino | 224/546 X |

*Primary Examiner*—Gregory M. Vidovich
*Attorney, Agent, or Firm*—Goldstein & Canino

[57] ABSTRACT

A snowboard rack, for transporting a snowboard in a pickup truck having a cab and a bed, the bed having a bed front, a bed rear, and bed side walls, comprising a header shaft and at least one carrier extending rearward from the header shaft. The carrier has a carrier sleeve which extends over the header shaft to allow slidable movement thereupon. The relative position of the carrier and the header shaft is fixed by tightening a set screw on the carrier sleeve. The header shaft extends across the bed near the bed front. The header shaft has a pair of side poles which engage the bed side walls and are spring tensioned thereagainst. The carrier has a pair of cradles which support the snowboard therein, and a strap mechanism which secures the snowboard within the cradles.

10 Claims, 4 Drawing Sheets

6,019,265

1

SNOWBOARD RACK FOR PICKUP TRUCKS

BACKGROUND OF THE INVENTION

The invention relates to a snowboard rack for pickup trucks. More particularly, the invention relates to a rack which secures within the bed of a pickup truck, and is capable of carrying one or more snowboards.

In recent years, snowboarding has soared in popularity. However, the availability of effective and convenient devices for transporting snowboards has not kept up with the resulting demand. Most such devices introduced into the marketplace have been awkward adaptations of commonly available ski carrying systems.

U.S. Pat. No. 5,390,837 to Ruffolo, Jr. discloses a snowboard rack which uses a base unit having a suction cup for securing the base unit against the exterior surface of the window. The Snowboard is then supported vertically therefrom. However, Ruffolo places the snowboard in a position where it is highly vulnerable to winds. Thus, Ruffolo will either considerably increase drag for the vehicle, or the resulting forces will rip the rack free of the vehicle, perhaps taking the window with it.

U.S. Pat. No. 4,469,257 to Parker discloses a ski rack device for pickup trucks. Parker attaches on both sides of one of the wheel wells, and supports a pair of skis thereabove. Parker is not intended for use with a snowboard. In addition, Parker could not be adapted for use with a snowboard, since the snowboard would need to be supported in a position extending above the bed side walls—where it would be vulnerable to cross winds.

While these units may be suitable for the particular purpose employed, or for general use, they would not be as suitable for the purposes of the present invention as disclosed hereafter.

SUMMARY OF THE INVENTION

It is an object of the invention to produce a snowboard rack which allows at least one snowboard to be securely and conveniently carried in a pickup truck. Accordingly, the snowboard rack extends within the bed of the pickup truck and supports the snowboard thereupon.

It is another object of the invention to produce a snowboard rack which allows the snowboard to be carried in the open bed of a pickup truck, but which is not vulnerable to wind. Accordingly, the snowboards are held close to the pickup truck bed so that they are effectively shielded from the wind by the truck bed sides.

It is a further object of the invention to provide a snowboard rack which adjusts to different width truck beds. Accordingly, the snowboard rack has a header shaft which in turn has a pair of spring tensioned side poles which tension against the sides to the truck bed, and then may be locked in place using a pair of set screws.

It is yet a further object of the invention that the snowboard rack supports two or more snowboards extending lengthwise on the truck bed. Accordingly, two or more carriers are slidably mounted to the header shaft, extend rearwardly therefrom, and perpendicular thereto.

It is a still further object of the invention to provide a snowboard rack which securely holds a snowboard in place. Accordingly, a pair of support cradles extend upward from each carrier. A strap mechanism secures the board within the support cradles.

The invention is a snowboard rack, for transporting a snowboard in a pickup truck having a cab and a bed, the bed having a bed front, a bed rear, and bed side walls, comprising a header shaft and at least one carrier extending rearward from the header shaft. The carrier has a carrier sleeve which extends over the header shaft to allow slidable movement thereupon. The relative position of the carrier and the header shaft is fixed by tightening a set screw on the carrier sleeve. The header shaft extends across the bed near the bed front. The header shaft has a pair of side poles which engage the bed side walls and are spring tensioned thereagainst. The carrier has a pair of cradles which support the snowboard therein, and a strap mechanism which secures the snowboard within the cradles.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
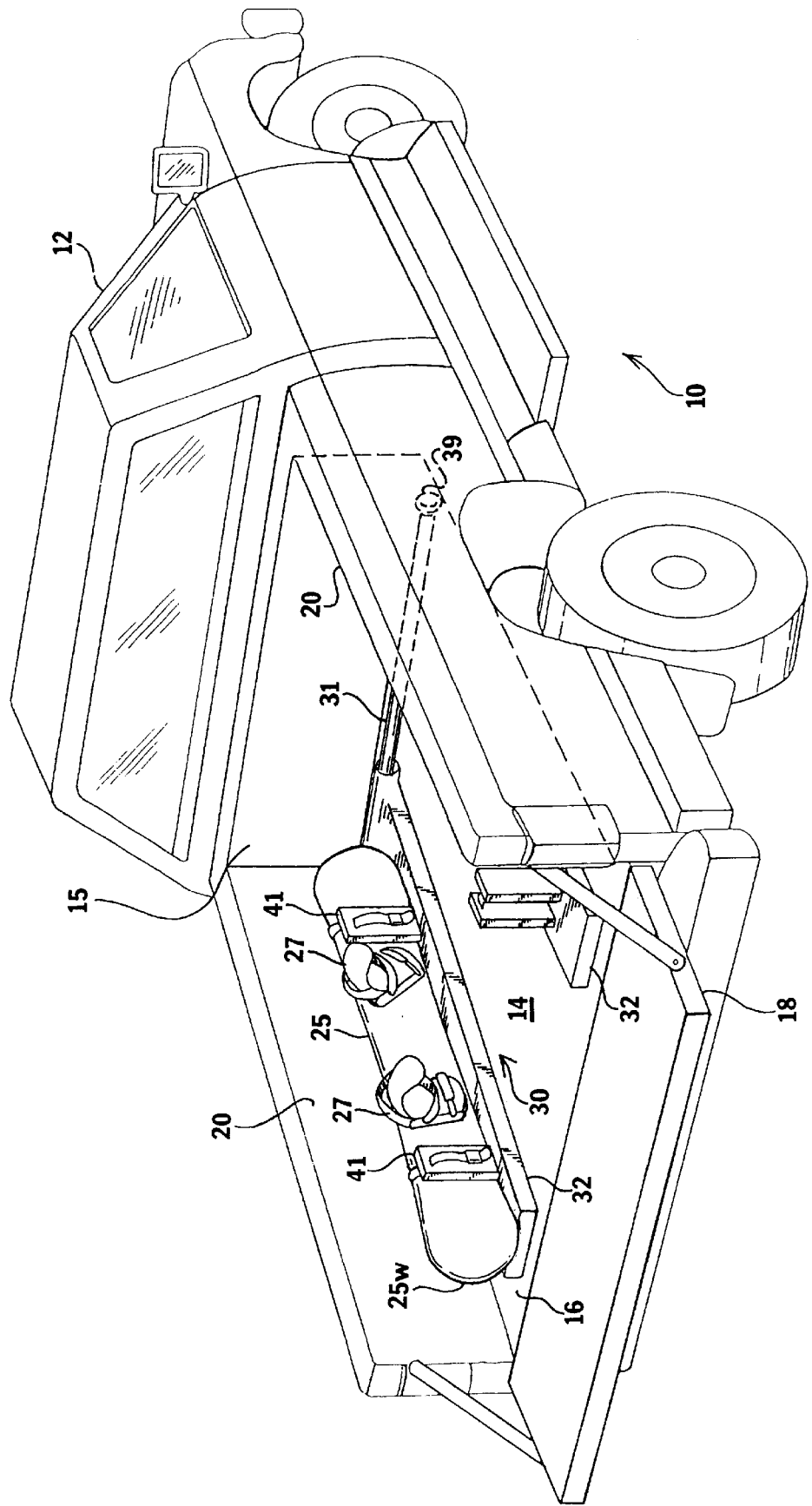
FIG. 1 is a diagrammatic perspective view of a pickup truck, with the invention installed therein.

FIG. 1 illustrates a pickup truck 10. The truck 10 has a cab 12, and a bed 14 rearward of the bed 14. The bed has a bed front 15 near the cab 12, and a bed rear 16 fully opposite the cab 12. A tail gate 18 is located at the bed rear 16. A pair of parallel side walls 20 extend upward from the bed 14, and extend between the bed front 15 and bed rear 16.

According to the present invention, a snowboard rack 30 is provided for supporting a snowboard 25. The snowboard 25 has a board width 25W and a pair of foot mounting devices 27, such as boot bindings or the like.

Figure 2:
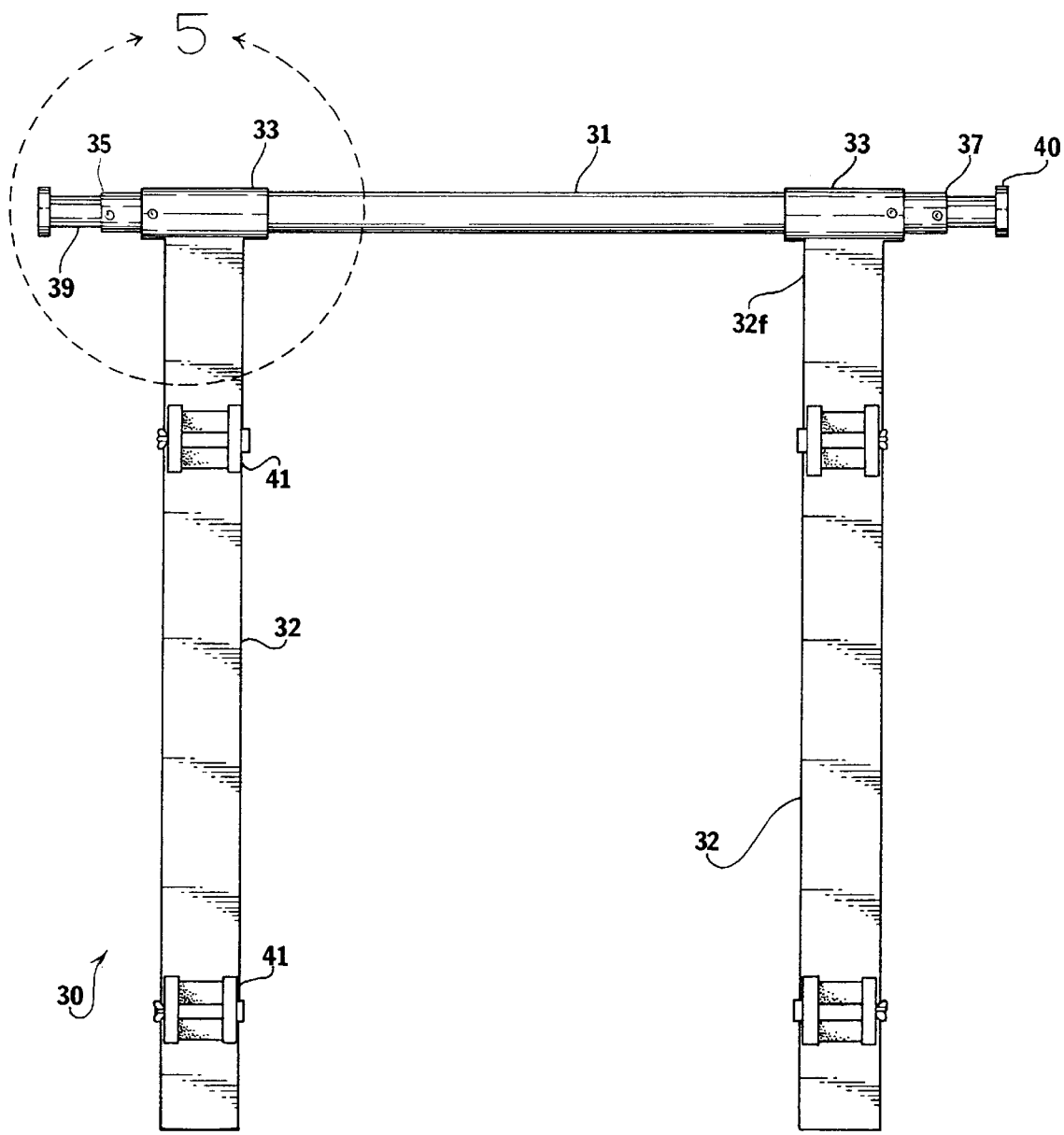
FIG. 2 is a top plan view, illustrating the invention, per se.

FIG. 2 is a top plan view of the snowboard rack 30. The snowboard rack 30 comprises a header shaft 31 and a pair of carriers 32 which extend rearwardly from the header shaft 31. The header shaft 31 is substantially cylindrical. The carriers 32 each have a carrier front 32F. The carriers 32 each have a carrier sleeve 33 at the carrier front 32F for attaching onto the header shaft 31. The carrier sleeve 33 allows slidable movement upon the header shaft 31.

The header shaft 31 has a first end 35 and a second end 37. A pair of side poles 39 extend from the first end 35 and the second end 37. The side poles 39 are capable of retracting into the header shaft 31 and extending outward therefrom, thus allowing the side poles to adjust so that they each engage one of the side walls of the pickup truck. The side poles 39 each have a non-slip head 40 for engaging the side walls and preventing the header shaft from slipping.

Figure 3:
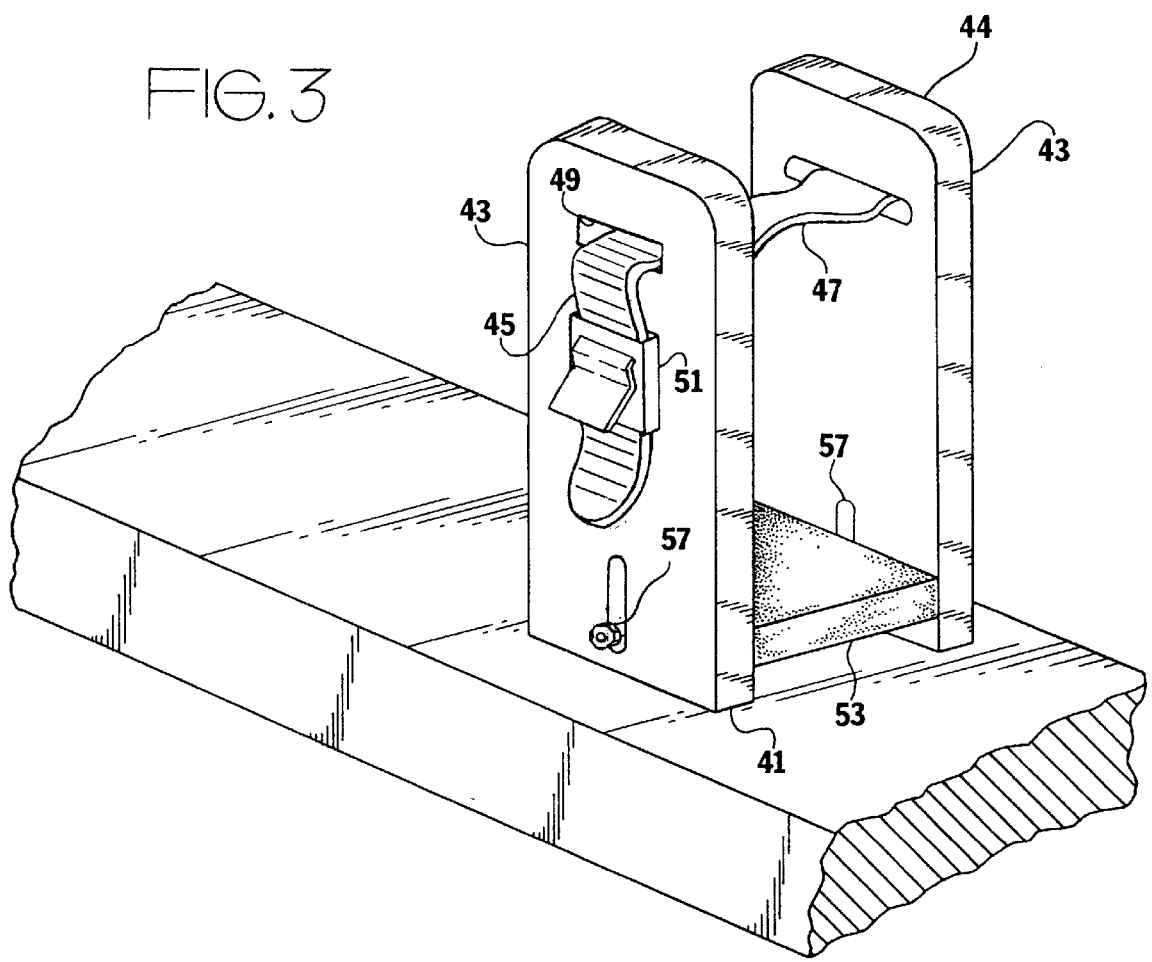
FIG. 3 is a diagrammatic perspective view, illustrating a support cradle of the invention.

The carriers 32 each have a pair of cradles 41 for supporting the snowboard. Referring to FIG. 3, each cradle comprises a pair of vertical supports 43 mounted thereupon. The vertical supports 43 each have a vertical support top 44 opposite the carrier 32. The cradles 41 further comprise a strap mechanism 45 which extends between the vertical supports for securing the snowboard in place. More particularly, each strap mechanism 45 comprises a primary strap 47 which is rigidly attached to one of the vertical supports of the cradle and extends through a strap slot 49 in the other vertical support of the cradle. The vertical support having the strap slot 49 also has a racheting buckle 51 for tightening the primary strap 47.

Each cradle 41 also has a bottom support 53 which is vertically moveable on the vertical supports. The bottom support 53 is padded so that it can support the weight of the snowboard while preventing damage thereto. The bottom support 53 is adjustable so as to vary a distance between the bottom support 53 and primary strap 47, to adjust to the snowboard width being supported so that the snowboard can be held securely in the cradle 41 between the bottom support 53 and primary strap 47.

Figure 4:
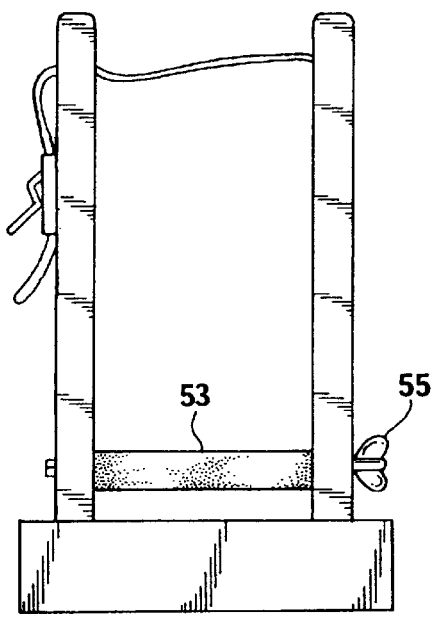
FIG. 4 is a side elevational view of the support cradle.

Referring to FIG. 4, the position of the bottom support 53 can be fixed by using a wing nut tightening mechanism 55, or any other suitable means. Now referring back to FIG. 3, it is a vertical slot 57 in the vertical supports which permits slidable vertical movement of the bottom support 53.

Figure 5:
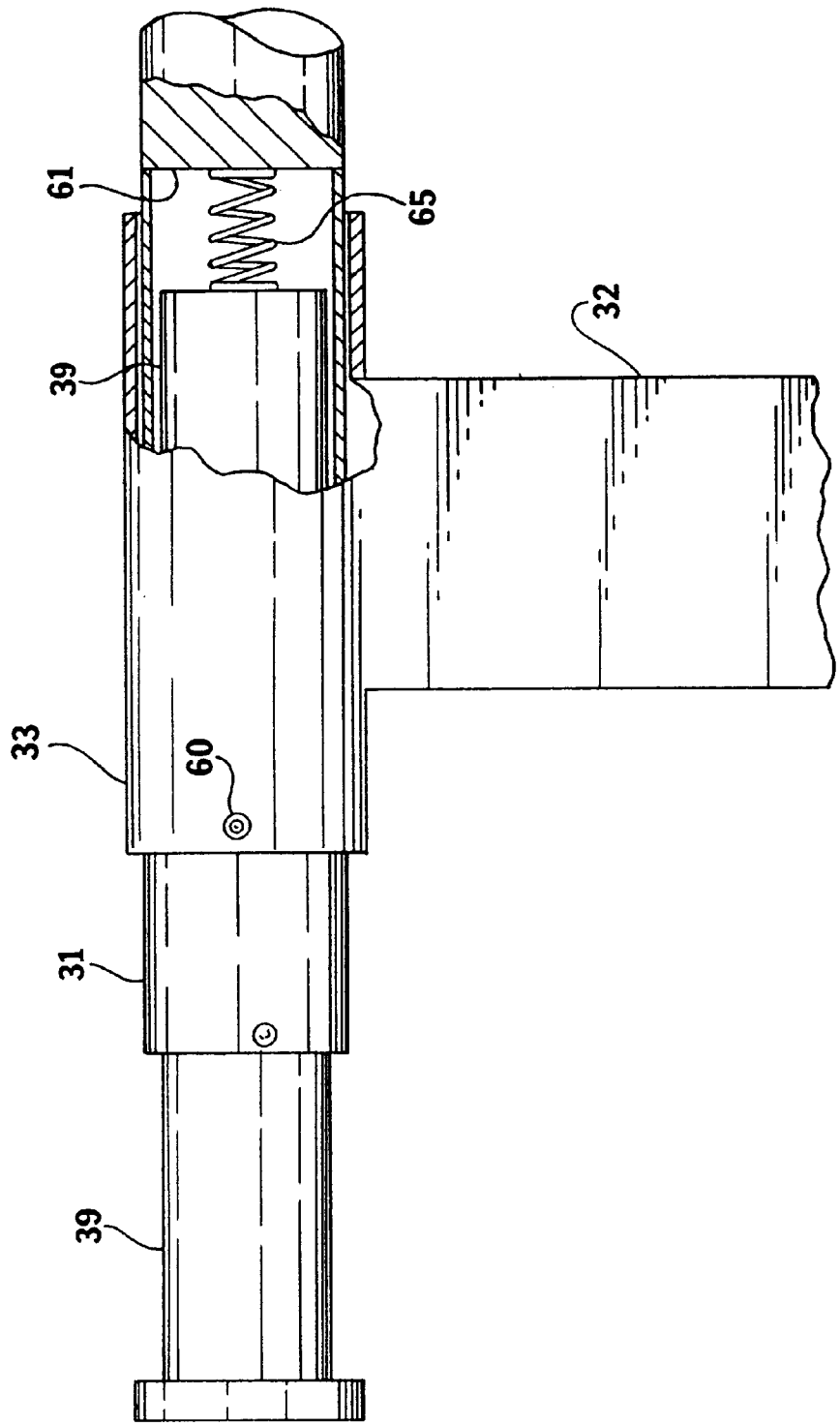
FIG. 5 is an enlarged top plan view, taken generally in the area of circle 5 in FIG. 2, with parts broken away to show a tensioning mechanism for holding the side poles against the truck bed sides.

FIG. 5 details the attachment of the carriers 32 to the header shaft 31. As illustrated, the carrier sleeve 33 extends over the header shaft 31 and allows slidable movement thereupon. Once the carrier 32 is in a suitable relative position with respect to the header shaft 31, a set screw 60 on the carrier sleeve 33 is tightened so as to engage the header shaft 31, and prevent slidable movement thereupon, thereby fixing the relative position of the header shaft 31 and carrier 32. Thus, the set screw 60 is selectively loosened to allow the position of each carrier 32 to be adjusted on the header shaft 31, and then is tightened to allow the position of said carrier 32 to be fixed with respect to the header shaft 31. Normally, the position of the carrier 32 is adjusted so that the carrier 32 is sufficiently inset from the bed walls to clear wheel wells which might extend into the truck bed. Preferably, the carrier is also positioned snugly against said wheel wells to increase the stability of the snowboard rack.

Also illustrated in FIG. 5, the header shaft 31 is open at both ends. The header shaft 31 has a header shaft block 61 located within the header shaft 31. The side tube extends into the header shaft 31 and engages the header shaft block 61. A tensioning mechanism comprises a spring 65 located between the header shaft block and the side tube 39, for biasing the side tube outward against the bed side walls.

Referring now back to FIG. 1, the snowboard rack 30 is placed upon the truck bed 14 with the header shaft 31 extending across the bed 14 and the side poles 39 engaging the bed sides 20. The carriers 32 extend rearwardly upon the bed, from the bed front 15 toward the bed rear 16. The snowboard 25 is supported upon one of the carriers 32, safely secured within the cradles 41.

In conclusion, herein is presented a snowboard rack for mounting within the bed of a pickup truck, attaching between the bed sides thereof, and securely holding one or more snowboards while being transported thereby.

What is claimed is:

1. A snowboard rack, for use in holding a snowboard within a pickup truck having a cab and a bed, the bed having a bed front near the cab and a bed rear opposite the cab, the truck further having bed sides, comprising:

a header shaft for extending across the bed, the header shaft having a first end, a second end, and a pair of side tubes, each said side tube respectively extending into one of the first end and the second end, the side tubes for respectively engaging the bed sides;

at least one carrier extending rearwardly from the header shaft substantially perpendicular to said header shaft, the carrier having a carrier sleeve extending over the header shaft for allowing slidable movement of the carrier sleeve thereupon; and a pair of cradles mounted on each said carrier, each cradle of said pair of cradles being distinct and spaced from each other on each said carrier the cradles each having a pair of vertical supports for holding the snowboard therebetween in an upright lateral position.

2. The snowboard rack as recited in claim 1, wherein the header shaft has a header shaft block near each of the first end and the second end, and wherein the side tubes are spring biased against the header shaft block.

3. The snowboard rack as recited in claim 2, wherein the carrier sleeve further comprises a set screw for selectively engaging the header shaft for selectively fixing the relative position of the carrier upon the header shaft.

4. The snowboard rack as recited in claim 3, wherein the cradles each have a strap mechanism which extends between the vertical supports for securing the snowboard in place between the vertical supports.

5. The snowboard rack as recited in claim 4, wherein the strap mechanism comprises a primary strap which is rigidly attached to one of the vertical supports of each cradle, wherein the other vertical support of said cradle has a strap slot and a buckle, and wherein the primary strap extends through the strap slot and attaches to the strap buckle.

6. The snowboard rack as recited in claim 5, wherein each cradle further comprises a bottom support which is vertically adjustable to alter a distance between the primary strap and said bottom support.

7. A snowboard transporting and storage method, for use with a snowboard and a pickup truck having a cab and a bed, the bed having a bed front near the cab, a bed rear, and bed sides, using a rack having a header shaft having a first end and a second end, side poles respectively extending from the first end and the second end, at least one carrier having a carrier sleeve which is slidably mounted on the header shaft and a pair of cradles on the carrier for supporting the snowboard, comprising the steps of:

placing the rack upon the bed such that the header shaft is located near the bed front and extends across the bed and the carrier extends rearwardly therefrom;

extending the side poles against the respective bed sides;

fixing the position of the side poles against the bed sides;

placing the snowboard between the cradles of the carrier; and securing the snowboard at each of the cradles.

8. The snowboard transporting and storage method as recited in claim 7, wherein each of the cradles further has a strap assembly, and wherein the step of securing the snowboard further comprises securing the snowboard with the strap assembly.

9. The snowboard transporting and storage method as recited in claim 8, further comprising the step of adjusting the relative position of the carrier on the header shaft by sliding the carrier on the header shaft.

10. The snowboard transporting and storage method as recited in claim 9, wherein the carrier sleeve has a set screw and wherein the step of fixing the position of the side poles against the bed sides further comprises fixing the carrier to the header shaft by tightening the set screw against the header shaft.

* * * * *